(12) United States Patent
Satoh

(10) Patent No.: US 10,446,870 B2
(45) Date of Patent: Oct. 15, 2019

(54) PRESSURE RELEASE MECHANISM FOR BATTERY PACK

(71) Applicant: Nissan Motor Co., Ltd., Yokohama-Shi, Kanagawa (JP)

(72) Inventor: Takeshi Satoh, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/762,983

(22) PCT Filed: Oct. 5, 2015

(86) PCT No.: PCT/JP2015/078144
§ 371 (c)(1),
(2) Date: Mar. 23, 2018

(87) PCT Pub. No.: WO2017/060942
PCT Pub. Date: Apr. 13, 2017

(65) Prior Publication Data
US 2018/0261872 A1 Sep. 13, 2018

(51) Int. Cl.
*H01M 10/04* (2006.01)
*H01M 2/02* (2006.01)
(Continued)

(52) U.S. Cl.
CPC ..... *H01M 10/0413* (2013.01); *H01M 2/0207* (2013.01); *H01M 2/10* (2013.01);
(Continued)

(58) Field of Classification Search
CPC .......... H01M 10/0413; H01M 2/1083; H01M 2/0207; H01M 2/1223; H01M 2/10; H01M 2/12; H01M 2200/20
See application file for complete search history.

(56) References Cited

U.S. PATENT DOCUMENTS 3,597,282 A * 8/1971 Farley ................ H01M 2/1223
136/208
6,080,505 A * 6/2000 Pate ........................ H01G 9/12
429/53
(Continued)

FOREIGN PATENT DOCUMENTS

CN 101911337 A 12/2010
JP 2010-165585 A 7/2010
(Continued)

*Primary Examiner* — Ula C Ruddock
*Assistant Examiner* — Matthew W Van Oudenaren
(74) *Attorney, Agent, or Firm* — Young Basile Hanlon & MacFarlane, P.C.

(57) ABSTRACT

A pressure release mechanism for a battery pack is constituted by a circular opening section and a gap adjustment plate. The gap adjustment plate is fixed to a wall through a pair of fixtures mutually opposed against each other via the opening section. When gas is generated due to an internal short-circuiting of any one or more of cells or so forth, the battery pack performs an elastic deformation trying to expand by itself. A gap is developed in association with a bending deformation of a wall surrounding the opening section in a direction orthogonal to the pair of fixtures. A high pressure gas in an inside of the pack casing is discharged externally via the gap.

8 Claims, 8 Drawing Sheets

(51) Int. Cl.
 *H01M 2/10* (2006.01)
 *H01M 2/12* (2006.01)
(52) U.S. Cl.
 CPC .......... *H01M 2/1083* (2013.01); *H01M 2/12* (2013.01); *H01M 2/1223* (2013.01); *H01M 2200/20* (2013.01)

(56) References Cited

U.S. PATENT DOCUMENTS

| | | | |
|---|---|---|---|
| 2012/0114993 A1* | 5/2012 | Park | H01M 2/1072 429/88 |
| 2014/0227565 A1* | 8/2014 | Wan | H01M 2/1205 429/56 |
| 2015/0221910 A1 | 8/2015 | Ishiguro et al. | |

FOREIGN PATENT DOCUMENTS

| | | |
|---|---|---|
| JP | 2014-041841 A | 3/2014 |
| JP | 2014-60165 A | 4/2014 |
| JP | 2014-107178 A | 6/2014 |
| JP | 2015-28907 A | 2/2015 |
| JP | 2015-125901 A | 7/2015 |

\* cited by examiner

PRESSURE RELEASE MECHANISM FOR BATTERY PACK

TECHNICAL FIELD

The present invention relates to a pressure release mechanism for a battery pack in which a plurality of batteries are accommodated in a pack casing and particularly relates to the pressure release mechanism for the battery pack having a relatively large capacity which can serve as a (motive) power source of an electric vehicle.

BACKGROUND

For example, a battery pack used in an electric vehicle is structured in a state in which a pack casing is substantially tightly sealed in order to prevent an invasion of rainwater, dust, or so forth into an inside of the pack casing. In other words, in order to avoid a pressure variation within the pack casing involved in a charge-discharge, a temperature variation, or so forth, the inside and an outside of the pack casing is slightly communicated with each other through a, so-called, breathing hole or so forth which allows an entrance and exit of a relatively small quantity of air but basically the pack casing is in a tightly sealed state.

On the other hand, in a case where a large quantity of gas is abruptly generated in the inside of the battery pack due to an internal short-circuit of any one or more of batteries, it is necessary to allow a quick escape of the internal pressure of the battery pack. Patent document D1 and patent document D2 disclose kinds of pressure release valves in each of which an opening section is installed at a part of the battery pack and a lid member enclosing this opening section is eliminated when gas is generated. Patent document 1 discloses one of the pressure release valves in which the lid member enclosing a rectangular opening section is broken, deformed, or blown off in response to the pressure within the battery pack so that the opening section is released. Patent document 2 discloses the other of the pressure release valve in which the lid member is formed of a low melting point material and is melted due to heat of gas generated in the battery pack.

In the conventional pressure release valve type structures described above, the lid member enclosing the opening section is structured so as to be weak as compared with the battery pack itself. Thus, when gas is abruptly generated in the inside of the battery pack, the opening section is released due to a breakage of the lid member, a permanent deformation, a melting elimination, or so forth. After gas in the inside of the battery pack is approximately exhausted and the pressure within the inside of the battery pack is reduced, the opening section remains in the released state. Hence, an external air, viz., oxygen easily flows into the inside of the battery pack and a possibility that an abrupt oxidization reaction is developed in the inside of the battery pack occurs. It should be noted that a third embodiment of patent document 2 discloses the pressure release valve in which a reed valve type backflow prevention valve (check valve). However, this backflow prevention valve (check valve) serves to guide a flow of a high temperature gas to the lid member made of a low melting point material to the lid member and the lid member itself is melted at a time of the gas generation. After all, the opening section remains in the released state.

In addition, since, in the structures of patent documents 1, 2, a part of the battery pack, viz., the lid member enclosing the opening section provides a position at which a strength is low, such another problem that a countermeasure against stepping (flying) stones is needed newly and easily occurs.

Patent document 1: A Japanese Patent Application First (Laid-open) Publication No. 2014-041841;
Patent document 2;
A Japanese Patent Application First (Laid-open) Publication No. 2014-107178.

SUMMARY

A pressure release mechanism according to the present invention, for a battery pack substantially tightly sealed and into which a plurality of batteries are accommodated, comprising:

an opening section formed to open a wall of a pack casing to communicate an inner space of the pack casing with an outer space of the pack casing; and a plate-like member arranged along an outer side surface of the pack casing or an inner side surface of the pack casing to enclose the opening section and locally fixed onto the wall at fixture sections of two locations mutually opposed against each other across the opening section.

In the pressure release mechanism according to the present invention, the pressure release is, basically, achieved utilizing an elastic deformation of the pack casing itself due to a pressure rise in an inside of the pack casing during a generation of gas. That is, when the pressure in the inside of the pack casing is raised in association with a generation of gas, the pack casing tries to expand by itself and a part of wall of the pack casing surrounding the opening section is under a bending deformation. Whereas, since the plate-like member overlapped on the opening section is locally fixed to the wall at two locations across the opening section, no deformation which follows the pack casing occurs. Consequently, a deformation quantity of the pack casing, viz., a gap having a magnitude which accords with an internal pressure of the pack casing is generated and the release of pressure through the opening section (in other words, an exhaust (discharge) of gas) is carried out via this gap.

When gas within the pack casing is mostly exhausted (discharged) and the pressure within the pack casing is reduced, the pack casing which has expanded tries to again return to an initial shape and the bending deformation of the wall of the pack casing surrounding the opening section becomes small. Therefore, the gap between the wall of the pack casing and the plate-like member becomes again small so that a passage area communicating an inside of the pack casing and an outside thereof is reduced. Ideally, the release of pressure is carried out within a range of the elastic deformation of the pack casing and the deformation of the wall surrounding the opening section is returned to 0 and a relationship between the opening section and the plate-like member is returned to an initial state.

Hence, after gas in the inside of the pack casing is mostly exhausted (discharged), the pack casing is again returned to the state in which the pack casing is substantially tightly sealed and the inside of the pack casing is slightly held in a very slight positive pressure state. Thus, a flow in of external air viz., oxygen is suppressed.

In this way, according to the present invention, a substantial passage area of the opening section can be obtained in a form which accords with the pressure in the inside of the pack casing in an extremely simple structure such that the plate-like member is overlapped on the opening section of the pack casing. Thus, a quick release of the internal pressure and during the generation of gas and a subsequent suppression of the flow-in of oxygen can be achieved. In addition, since a function such as a rupture (breaking) or so forth by a pressure is not necessary for the plate-like member covering the opening section, it is possible to maintain the same strength as the other part of the pack casing against stepping (flying) stones or so forth.

DETAILED DESCRIPTION OF THE EMBODIMENTS

Preferred embodiments according to the present invention will, hereinafter, be described in details on a basis of drawings.

Figure 1:
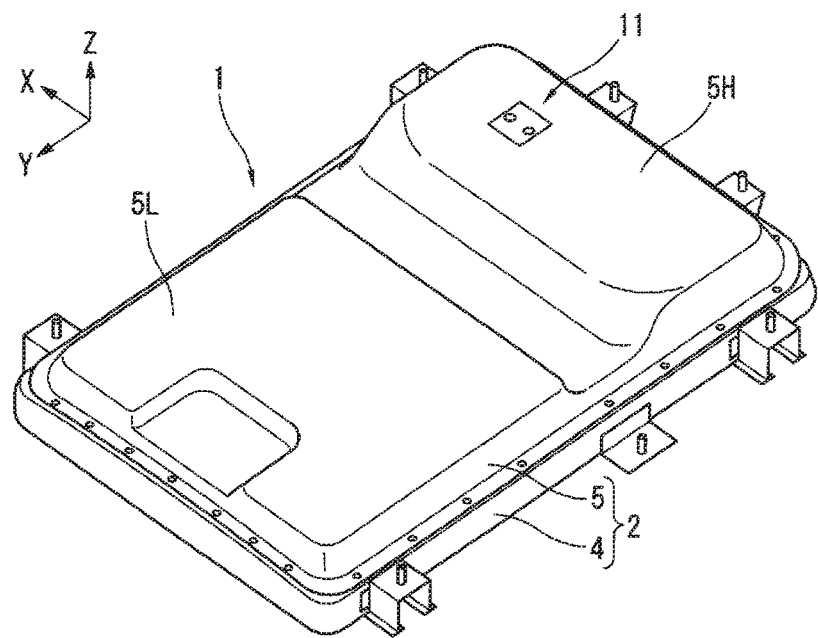
FIG. 1 is a perspective view of a battery pack of an execution example in which a pressure release mechanism according to the present invention is equipped.

FIG. 1 shows a perspective view representing an execution example in which the present invention is applied, for example, to a battery pack 1 for an electric vehicle. This battery pack 1 houses (accommodates) a great (multiple) number of batteries 3 (refer to FIG. 2) within a pack casing 2 having a substantially rectangular box shape. Pack casing 2 includes: a tray shaped pack casing lower 4 constituting a lower side section of the pack casing; and a pack casing upper 5 constituting an upper side section of the pack casing. Pack casing lower 4 and pack casing upper 5 are formed in a tray shape by a press molding of respective suitable plate-thickness steel plates, are mutually joined together at their peripheral edge sections, and are mutually coupled together through bolts or so forth (not shown). Junction surfaces of both of the pack casing lower and the upper casing lower are sealed with a suitable sealing material such as a liquid gasket or so forth. The inside of pack casing 2 is substantially tightly sealed in order to prevent an invasion of rain water, dust, or so forth from an external. It should be noted that, in order to avoid a pressure variation within pack casing 2 in association with a charge-discharge or a temperature variation, entrance and exit of a relatively small quantity of air via, for example, a breathing hole or so forth (not shown) are allowed.

Figure 2:
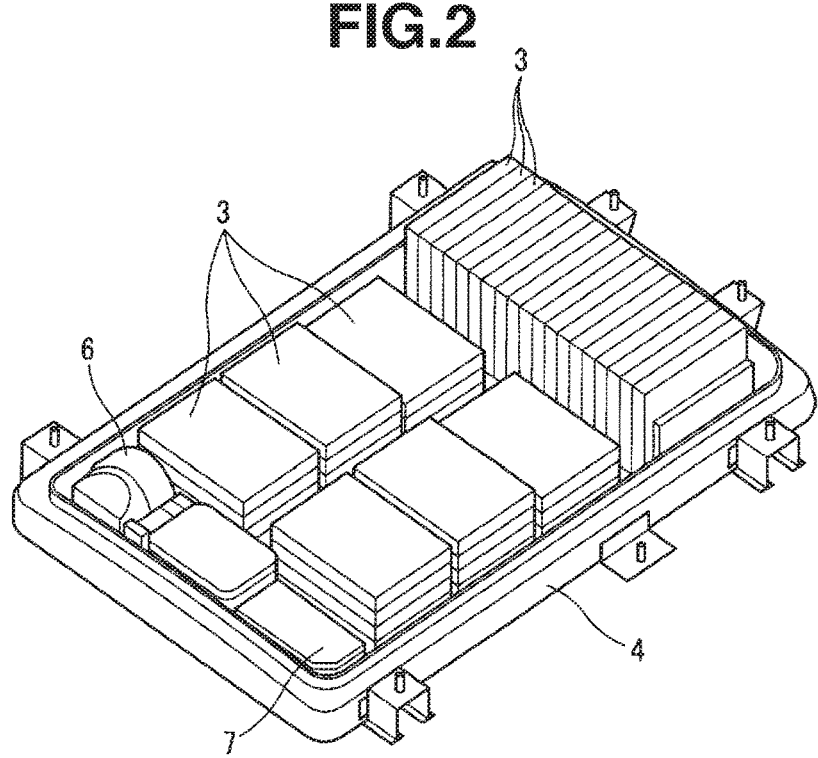
FIG. 2 is a perspective view representing a structure in an inside of the battery pack from which a pack casing upper is removed.

FIG. 2 shows a structure of the inside of battery pack 1 in a state in which pack casing upper 5 is removed.

In this embodiment, respective batteries 3 are constituted as battery modules in which a plurality of (for example, four) flat lithium-ion cells sealed with laminate films as exterior bodies are piled up and accommodated within box shaped metal casings. A plurality of batteries 3, each having a flat rectangular parallelepiped shape, are arranged vertically in parallel to one another at one end section of an elongate direction (Y direction shown in FIG. 1) of pack casing 2 and, at a region of the remaining section of pack casing 2, are arranged side by side in a, so-called, flat loaded formation. At the other end section in the elongate direction of pack casing 2, a cooling fan 6, a junction box 7, and so forth are arranged.

As will be appreciated from FIG. 2, a dimension of a vertical direction (Z direction in FIG. 1) of respective batteries 3 in the vertically arranged form becomes large, as compared with the region in which the batteries are arranged in the flat load formation. As shown in FIG. 1, a ceiling surface of pack casing upper 5 is structured in a form corresponding to an unevenness of the arrangement of such batteries as described above. In details, pack casing upper 5 includes a high ceiling section 5H in the one end section of the elongate direction and a low ceiling section in the remaining section.

A pressure release mechanism 11 according to the present invention can be installed at an arbitrary position of pack casing 2. However, in this embodiment, pressure release mechanism 11 as will be described later is arranged at a high ceiling section 5H on which a bending deformation appears relatively largely along a forward-and-backward direction (Y direction in FIG. 1) of pack casing 2 when an internal pressure of the pack casing is raised. It should be noted that a steel plate having a thinner plate-thickness than pack casing lower 4 is used for back casing upper 5 and, when the internal pressure is raised, pack casing upper 5 is relatively largely deformed than pack casing lower 4.

Figure 3:
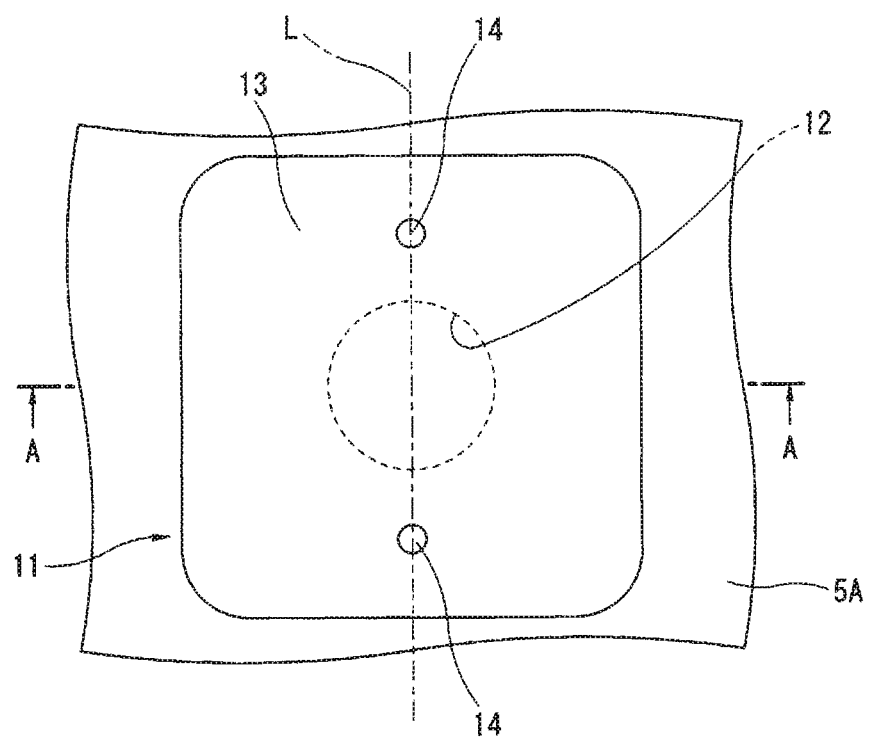
FIG. 3 is a plan view of an essential part of the pack casing upper representing a first preferred embodiment of the pressure release mechanism.
Figure 4:
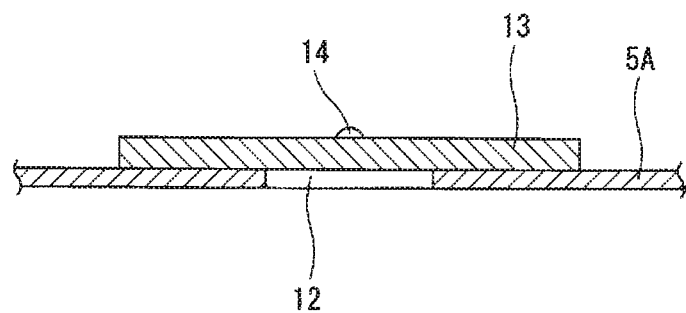
FIG. 4 is a cross sectional view of the essential part cut away along a line A-A in FIG. 3.

FIGS. 3 and 4 show a first preferred embodiment of pressure release mechanism 11. This pressure release mechanism 11 includes: a circular opening section 12 formed to open a wall 5A of pack casing upper 5 at high ceiling section 5H; and a plate-like member, viz., a gap adjustment plate 13 arranged along an outer side surface of wall 5A of pack casing upper 5 to enclose (cover) this opening section 12. Above-described opening section 12 is set to have a suitable magnitude dependent upon a capacity of battery pack 1 or so forth. In this embodiment, opening section 12 has a diameter of approximately several centimeters. It should be noted that, in pressure release mechanism 11 in this embodiment, a final passage area is dependent upon a length of a peripheral edge (an opening edge) of opening section 12 not dependent upon an opening area of opening section 12 itself.

Gap adjustment plate 13 is, for example, made of a suitable plate-thickness steel plate and is of a flat plate shape in a substantially square whose corner sections are rounded. it is desirable for gap adjustment plate 12 not to be deformed due to the internal pressure of pack casing 2. For example, a steel plate having a thickness thicker than the plate thickness of a material of pack casing upper 5 is, for example, used for this gap adjustment plate. Gap adjustment plate 13 is formed in the substantially square shape in FIG. 3. However, gap adjustment plate 13 can be formed in an arbitrary shape such as a circle, a hexagon, an octagon, a rectangle, or so forth. Then, gap adjustment plate 13 is overlapped on an outer side surface of opening section 12 with a center of gap adjustment plate 13 made coincident with a center of opening section 12. Gap adjustment plate 13 is attached onto wall 5A through a pair of fixtures 14 arranged to be opposed against each other across opening section 12. As fixtures 14, for example, bolts, rivets, or so forth can be used. Or alternatively, gap adjustment plate 13 may be fixed to wall 5A through a welding or so forth in place of pair of fixtures 14. Hence, gap adjustment plate 13 enclosing opening section 12 is locally fixed to wall 5A only at two locations of the wall opposed against each other across opening section 12 in a range of a whole periphery of 360o of opening section 12. It should be noted that, in FIG. 3, the pair of fixture sections separated from each other by 180o is constituted by a pair of single fixtures 14 (bolts, rivets, or so forth). The present invention is not limited to this. It is possible to use two bolts for the single fixture section.

As a direction of fixation through above-described fixtures 14, it is desirable for a straight line L connecting pair of fixtures 14 (refer to FIG. 3) to be along a width direction (X direction in FIG. 1) of pack casing 2. In other words, as a flexural rigidity of wall 5A onto which gap adjustment plate 13 is attached, as compared with the flexural rigidity of wall 5A along the direction connecting pair of fixtures 14 (X direction in FIG. 1), the flexural rigidity of wall 5A along the direction (Y direction in FIG. 1) orthogonal to the direction connecting pair of fixtures 14 is relatively low.

In the above-described pressure release mechanism 11 in the first embodiment described above, at a normal (ordinary) usage time, gap adjustment plate 13 is placed in the proximity of an opening edge of opening section 12 and opening section 12 is substantially closed. Hence, an invasion of foreign matters through opening section 12 can be prevented. Especially, since gap adjustment plate 13 is constituted by the plate-like member, for example, the steel plate having a high rigidity, this plate is not a position whose rigidity is locally low and there is no possibility of damages due to stepping (flying) stones and so forth.

Figure 5A:
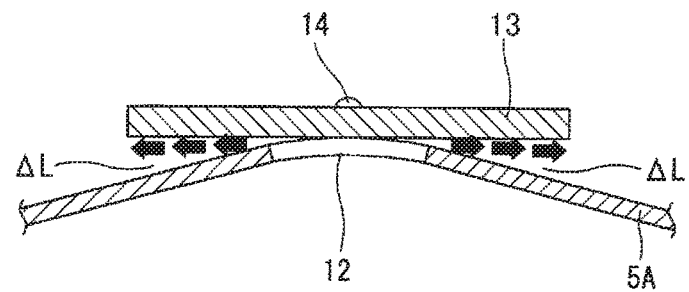
FIGS. 5(a) and 5(b) are state comparison cross sectional explanation views of an essential part cut away along line A-A in FIG. 3 when the pack casing expands due to an internal pressure of the pack casing, FIG. 5(a) showing the essential part when the internal pressure is high and FIG. 5(b) showing the essential part when the internal pressure is relatively low.
Figure 5B:
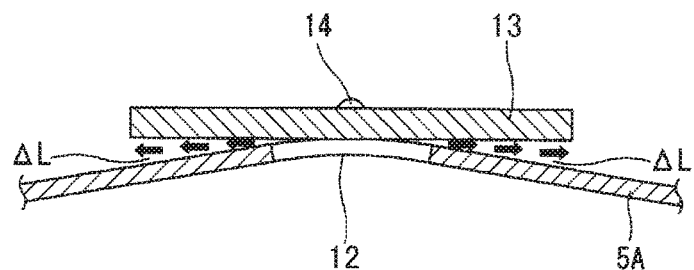
Figure 6:
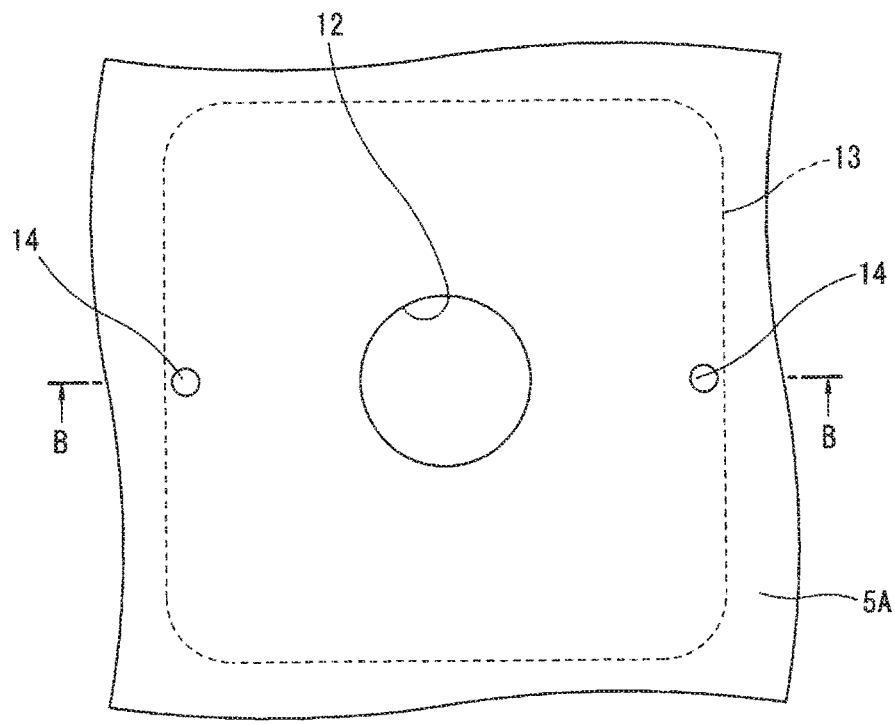
FIG. 6 is a plan view of the essential part of the pack casing upper representing a second preferred embodiment of the pressure release mechanism.

On the other hand, FIGS. 5(a) and 5(b) show states in which gas due to an internal short-circuit of any one or more cells is generated and the pressure within pack casing 2 is raised.

When the (internal) pressure within pack casing 2 is raised, each part of pack casing 2 based on a pressure difference between the internal pressure and the atmospheric pressure receives a force from the inside of pack casing 2 and pack casing 2 of the substantially rectangular shape in cross section is under a bending deformation trying to expand toward the outside of the pack casing. At this time, wall 5A and gap adjustment plate 13 are not separated from each other in the direction (the direction along line L in FIG. 3) in which wall 5A and gap adjustment plate 13 are joined in the range of 360o of opening section 12. However, in the direction (the direction along line A-A in FIG. 3) orthogonal to that direction, gap adjustment plate 13 is separated from the opening edge of opening section 12 and a gap (ΔL) is developed as shown in FIGS. 5(a) and 5(b) in association with the bending deformation of a part of wall 5A which surrounds opening section 12.

Hence, high-pressure gas in the inside of pack casing 2 is discharged (exhausted) externally from opening section 12 via gap ΔL as denoted by arrows in FIGS. 5(a) and 5(b). It should, herein, be noted that, since pack casing 2 itself receives the pressure difference in a wide area, the deformation of wall 5A with a relative low pressure difference occurs and it is possible to start the discharge (exhaust) of gas in a favorable response characteristic.

It should be noted that, as the flexural rigidity in the direction along the cross section of FIGS. 5(a) and 5(b), it is desirable that the flexural rigidity of gap adjustment plate 13 is higher than the flexural rigidity of above-described wall 5A. However, in this embodiment, wall 5A is deformed in the direction away from gap adjustment plate 13. Hence, no special problem occurs even if the flexural rigidity of gap adjustment plate 13 is higher than the flexural rigidity of wall 5A.

A magnitude (dimension) of above-described gap ΔL is varied in accordance with a degree of the flexural (bending) deformation, viz., the pressure in the inside (internal pressure) of pack casing 2 (strictly, a pressure difference from the external atmospheric pressure). When the internal pressure is very high, gap ΔL is largely developed, as shown in FIG. 5(a) and, when the internal pressure is relatively low, gap ΔL becomes relatively small, as shown in FIG. 5(b).

The deformation of pack casing 2 is basically carried out in the range of the elastic deformation. In other words, a sufficient gap ΔL is developed in the range of the elastic deformation and high-temperature gas is discharged (exhausted).

Hence, when the pressure is reduced with gas within pack casing 2 mostly exhausted (discharged), wall 5A of pack casing 2 tries to return to an initial shape and gap adjustment plate 13 returns to a state in which gap adjustment plate 13 is placed in the proximity of opening section 12 as shown in FIG. 4. When gap adjustment plate 13 substantially closes opening section 12, the inside of pack casing 12 is closed, the inside of pack casing 2 is held in a very slightly positive pressure state. Therefore, air of the external through opening section 12, viz., a flow-in of oxygen is suppressed.

It should be noted that gap adjustment plate 13 is contacted on the inside of wall 5A, as shown in FIG. 4, as the initial state. However, a suitable initial gap of, for example, about 1 through 3 mm may be provided between both of gap adjustment plate 13 and wall 5A. The magnitude of the initial gap is set with a flow quantity of gas required when wall 5A is under the bending deformation as shown in FIG. 5(a) (in other words, an opening area) and the flow quantity of gas which is allowable when pack casing 2 is returned to the initial state as shown in FIG. 4 taken into consideration.

In this way, opening section 12 can relatively be miniaturized by providing the suitable initial gap.

Next, a second preferred embodiment of pressure release mechanism 11 on a basis of FIGS. 6 through 8(b). In the second embodiment, gap adjustment plate 13 is arranged along an inside (inner) surface of opening section 12 provided along pack casing 2. This gap adjustment plate 13 has basically the same structure as the first embodiment, for example, is made of the suitable plate-thickness steel plate, and takes the form of the approximately square flat plate shape whose corner sections are rounded. Then, gap adjustment plate 13 is piled up (overlapped) on the inside (inner) surface of opening section 12 with the center of gap adjustment plate 13 coincident with the center of opening section 12.

In addition, gap adjustment plate 13 is attached onto wall 5A with pair of fixtures 14 arranged to be opposed against each other across opening section 12. It should be noted that, as described hereinabove, the suitable initial gap may be provided between the inside surface of wall 5A and gap adjustment plate 13.

It should, herein, be noted that, in the second embodiment, the direction of fixture of gap adjustment plate 13 with respect to pack casing 2 is 90o different from the above-described first embodiment. It is, specifically, desirable for the direction of line B-B in FIG. 6 connecting pair of fixtures 14 to take an attachment attitude along the elongate direction (Y direction in FIG. 1) of pack casing 2. Hence, as the flexural (bending) rigidity of wall 5A at the position of wall 5A to which gap adjustment plate 13 can be attached, the flexural (bending) rigidity of wall 5A to which the flexural rigidity of wall 5A along the direction (Y direction in FIG. 1) connecting pair of fixtures 14 is relatively lower than the flexural rigidity of wall 5A along the direction (X direction in FIG. 1) orthogonal to the direction connecting the pair of fixtures.

In addition, the flexural rigidity of gap adjustment plate 13 is higher than the flexural rigidity of wall 5A of pack casing 2. Especially, as the flexural rigidity along line B-B connecting the pair of fixtures 14 at two positions, the flexural rigidity of gap adjustment plate 13 is higher than flexural rigidity of wall 5A.

Figure 7:
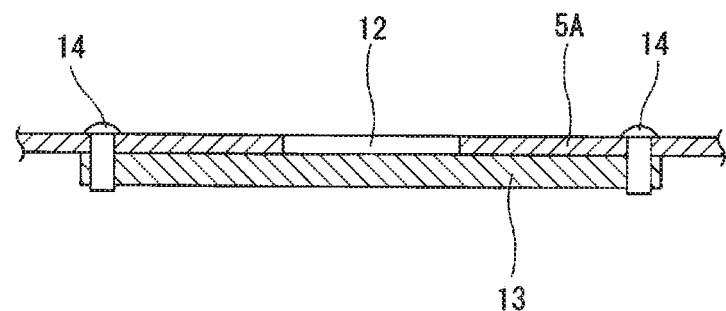
FIG. 7 is a cross sectional view of the essential part cut away along line B-B in FIG. 6.

In pressure release mechanism 11 in the second embodiment described above, during the normal (ordinary) usage, as shown in FIG. 7, gap adjustment plate 13 is placed in the proximity of the opening edge of opening section 12 and opening section 12 is substantially closed from the inside of the pack casing. Hence, the invasion of foreign matters through opening section 12 is prevented. Especially, since gap adjustment plate 13 is constituted by the plate-like member having the high rigidity, viz., for example, the steel plate, gap adjustment plate 13 does not provide a locally weak position and there is no possibility of receiving damages due to stepping (flying) stones or so forth.

Figure 8A:
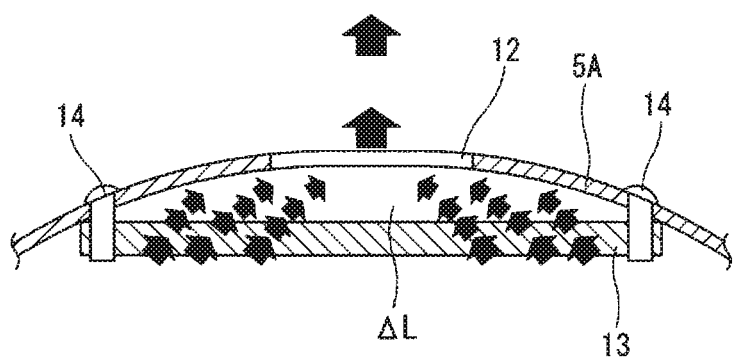
FIGS. 8(a) and 8(b) are state comparison cross sectional views of the essential part cut away along line B-B in FIG. 6 when the pack casing expands due to the internal pressure of the pack casing, FIG. 8(a) showing the essential part when the internal pressure is high and FIG. 8(b) showing the essential part when the internal pressure is relatively low.

On the other hand, when gas due to the internal short-circuit of any one or more cells is generated and the pressure within pack casing 2 is raised, each part of pack casing 2 receives the force from the inside of the pack casing on a basis of the pressure difference with respect to the atmospheric pressure and pack casing 2 performs the bending deformation, trying to expand toward the outside thereof, as shown in FIG. 8(a). At this time, in the range of 360o of opening section 12, in the direction (the direction of line B-B in FIG. 6) in which wall 5A and gap adjustment plate 13 are joined together through pair of fixtures 14, as shown in FIG. 8(a), wall 5A is bended toward the outside of the pack casing in a form with pair of fixtures as fixture ends and opening section 12 is separated from gap adjustment plate 13 and gap ΔL is accordingly developed. In the direction orthogonal to line B-B connecting pair of fixtures 14, the magnitude of bending deformation of wall 5A is smaller than the bending deformation in the cross section shown in FIG. 8(a). Then, since fixtures 14 are not provided in this direction, gap adjustment plate 13 is in a separation state from wall 5A.

Figure 8B:
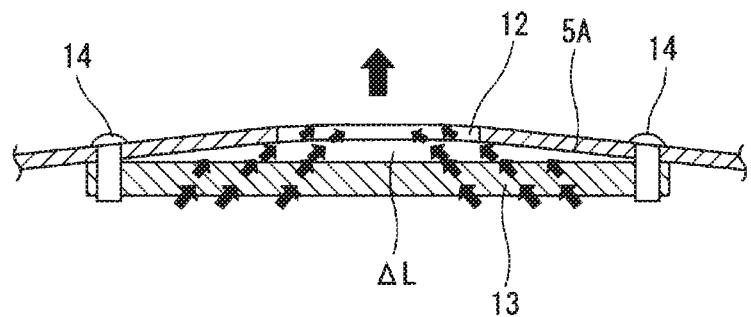
Figure 9:
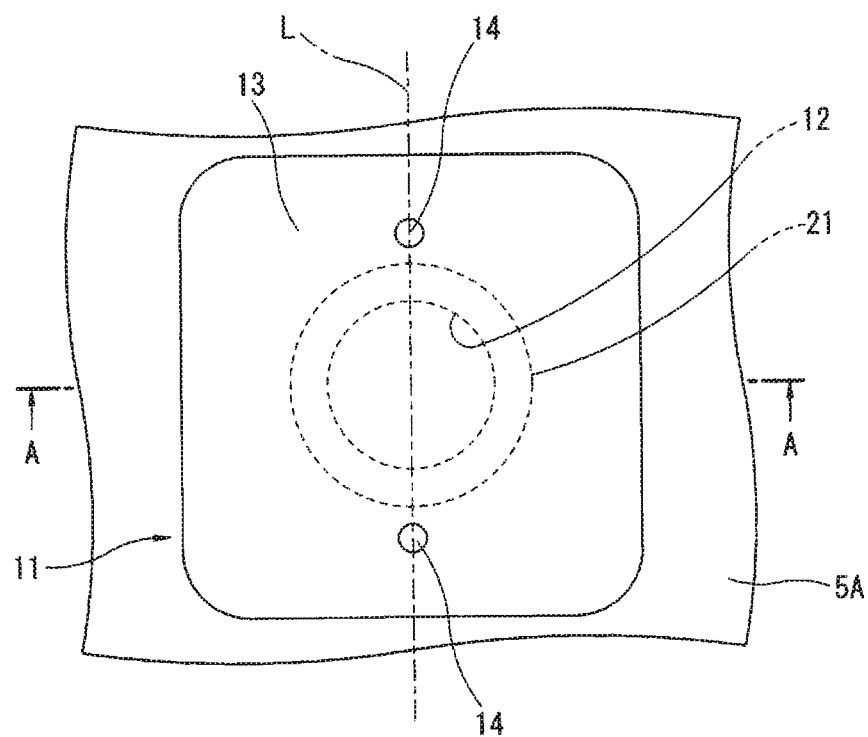
FIG. 9 is a plan view of an essential part of the pack casing upper representing a third preferred embodiment of the pressure release mechanism.
Figure 10:
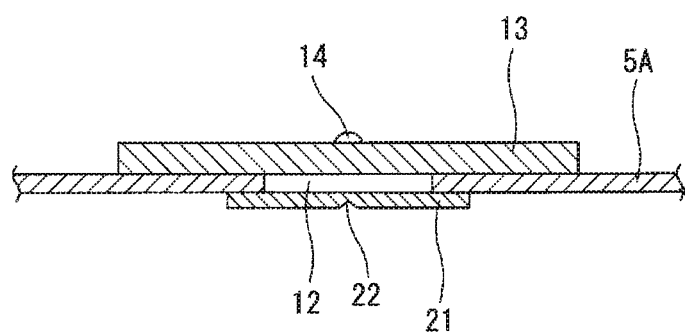
FIG. 10 is a cross sectional view of the essential part cut away along line C-C in FIG. 9.

Hence, high-pressure gas in the inside of pack casing 2 is exhausted (discharged) externally from opening section 12 through gap ΔL as shown in arrow marks shown in FIGS. 8(a) and 8(b). Since, in the second embodiment, the pressure difference is received in a wide area of pack casing 2 itself, the deformation of wall 5A occurs due to the relatively low pressure difference and it is possible to start the exhaust (discharge) of gas in the relatively favorable responsive characteristic.

Since, in the second embodiment, a magnitude of above-described gap ΔL is varied in accordance with a degree of the flexural (bending) deformation of wall 5A, viz., the pressure in the inside of pack casing 2 (strictly, the pressure difference with respect to the external atmospheric pressure). When the internal pressure is very high, gap ΔL is largely generated, as shown in FIG. 8(a). When the internal pressure is relatively low, gap ΔL is relatively small as shown in FIG. 8(b).

Since, even in the second embodiment, the deformation of pack casing 2 is basically carried out in the range of the elastic deformation, gap adjustment plate 13 substantially closes again opening section 12. Thus, since the inside of pack casing 2 is held in the very slight positive pressure state and the flow-in of external air, viz., oxygen is suppressed.

Next, on a basis of FIGS. 9 through 11(b), a third preferred embodiment of pressure release mechanism 11 will, hereinafter, be described. The third embodiment has the basic structure which is the same as the first embodiment. Furthermore, on the inside (surface) of opening section 12, a sheet-like or a thin plate rupture member 21 is equipped which is ruptured (broken) by a predetermined pressure. In this embodiment, rupture member 21 is made of a circular, thin, aluminum plate and a recess groove 22 is provided along a diameter direction of rupture member 21 in order for rupture member 21 to be split into two in a semi-circular form. This rupture member 21 is arranged to be overlapped on the inside of opening section 12 to close opening section 21 and a peripheral edge section of rupture member 21 is joined onto the inside surface of wall 5A via an adhesive or so forth.

Figure 11A:
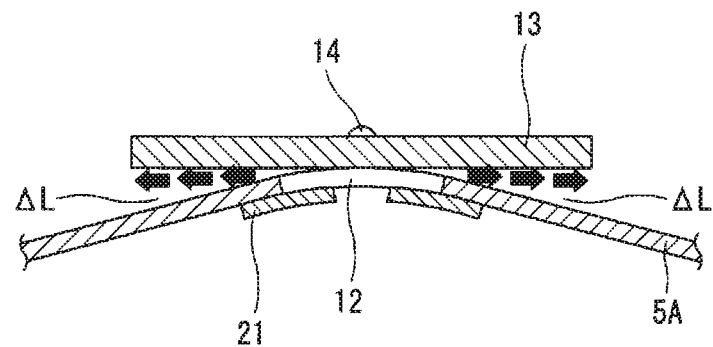
FIGS. 11(a) and 11(b) are state comparison cross sectional explanation views of the essential part cut away along line C-C in FIG. 9 when the pack casing expands due to the internal pressure, FIG. 11(a) showing the essential part when the internal pressure is high and FIG. 11(b) showing the essential part when the internal pressure is relatively low.
Figure 11B:
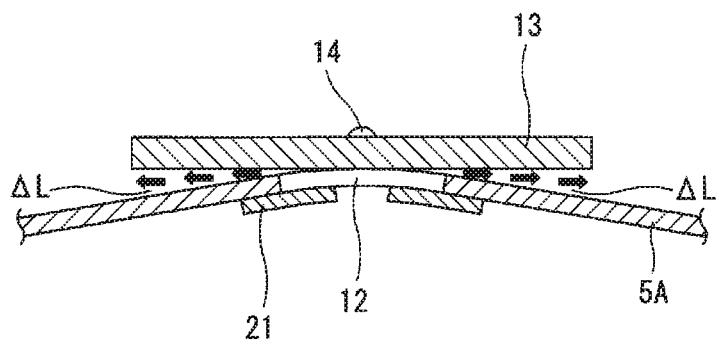
Figure 12:
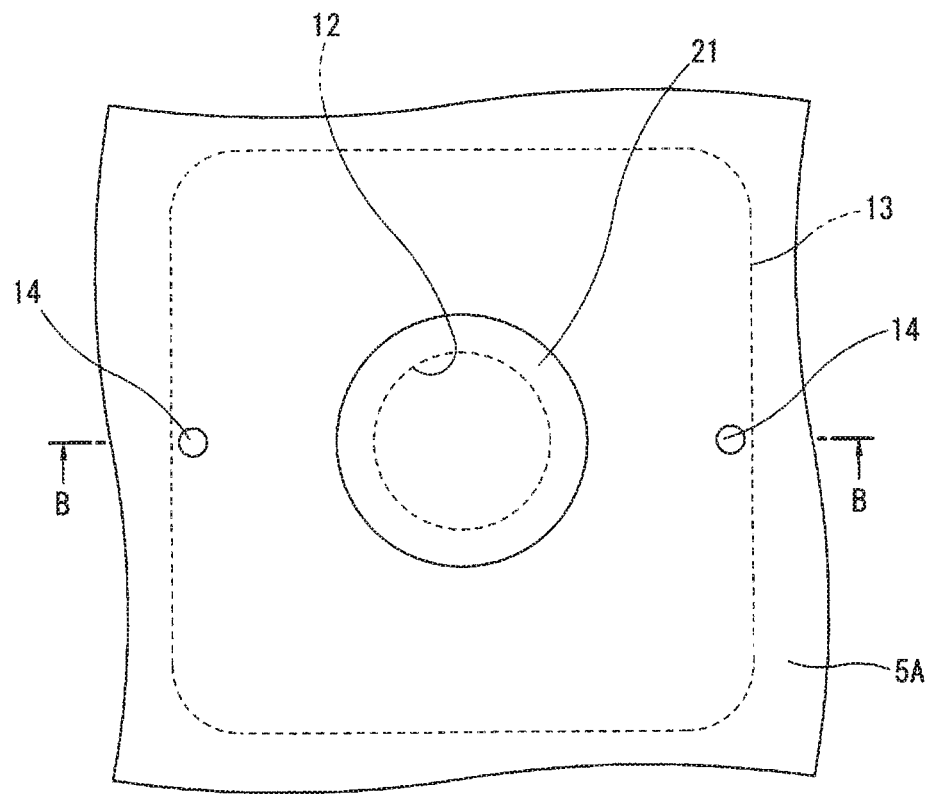
FIG. 12 is a plan view of an essential part of the pack casing upper representing a fourth preferred embodiment of the pressure release mechanism.
Figure 13:
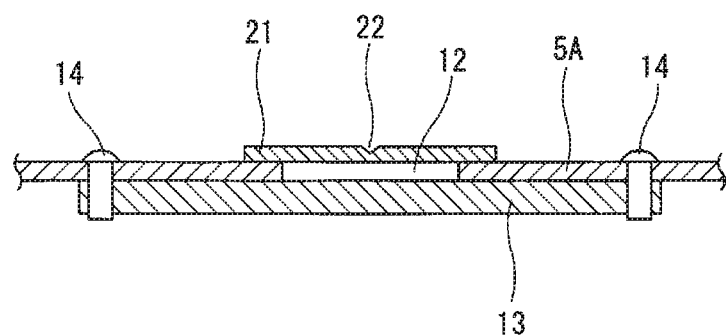
FIG. 13 is a cross sectional view cut away along line D-D in FIG. 12.
Figure 14A:
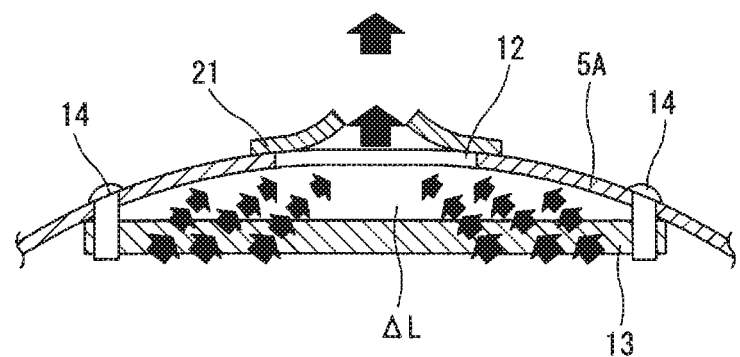
FIGS. 14(a) and 14(b) are state comparison cross sectional views cut away along line D-D in FIG. 12 when the pack casing expands due to the internal pressure, FIG. 14(a) showing the essential part when the internal pressure is high and FIG. 14(b) showing the essential part when the internal pressure is relatively low.
Figure 14B:
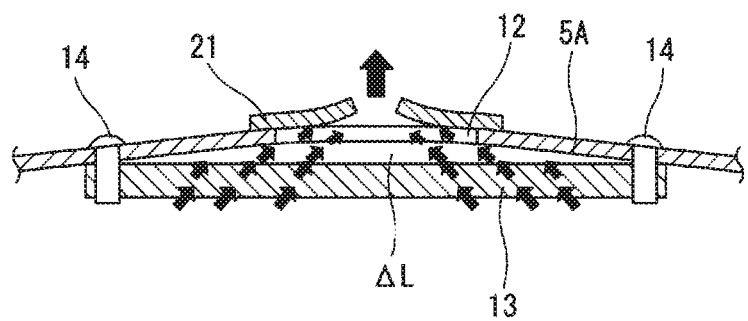

In this way, rupture member 21 overlapped on opening section 12 is ruptured (broken) by the predetermined pressure, as shown in FIGS. 11(a) and 11(b), when gas is generated due to the internal short-circuit of any one or more of cells or so forth and the pressure within pack casing 2 is raised. At this time, since gap ΔL is developed in association with the elastic deformation of pack casing 2, as described before, the discharge (exhaust) of gas is started at the same time of the rupture (breakage) of rupture member 21.

When gas is mostly discharged (exhausted) and the pressure within pack casing 2 is reduced, in the same way as the first embodiment, gap adjustment plate 13 substantially closes opening section 12 and the flow-in of oxygen or air is suppressed.

In this way, in the structure in which rupture member 21 is further equipped, even if gap ΔL expands (enlarges) due to some deformation of pack casing 2, opening section 12 is held in a closed state until rupture member 21 reaches a setting pressure under which rupture member 21 is ruptured (broken). Hence, the setting of the pressure under which pressure release mechanism 11 is released is easy and highly accurate. In addition, a sealing characteristic of opening section 12 in the initial state is improved and the flow-in of air or oxygen is suppressed. Especially, as described before, in a case where the initial gap is provided between wall 5A and gap adjustment plate 13, the invasions of rain water and dust through the initial gap can assuredly be prevented through rupture member 21.

Next, FIGS. 12 through 14(b) show a fourth preferred embodiment of pressure release mechanism 11 in which rupture member 21 is further equipped in the basic structure as the second embodiment. In this embodiment, rupture member 21 is overlapped on an outer side surface of opening section 12 installed on wall 5A. The other structure than rupture member 21 and its action are the same as those of the third embodiment described hereinbefore.

The invention claimed is:

1. A pressure release mechanism for a sealed battery pack into which a plurality of batteries are accommodated, comprising:
    an opening section formed to open a wall of a pack casing to communicate an inner space of the pack casing with an outer space of the pack casing; and
    a plate-like member arranged along an outer side surface of the pack casing or an inner side surface of the pack casing to enclose the opening section, wherein the plate-like member is fixed onto the wall via two fixture sections mutually opposed against each other across the opening section, the two fixture sections being constituted by fixtures or being made through a welding, wherein a flexural rigidity of the wall along a direction connecting the fixture sections of two locations is higher than the flexural rigidity of the wall along a direction orthogonal to the direction connecting the fixture sections.

2. The pressure release mechanism for the sealed battery pack as claimed in claim 1, wherein the platelike member is arranged along the outer side surface of the wall.

3. The pressure release mechanism for the sealed battery pack as claimed in claim 1, wherein the platelike member is arranged along the inner side surface of the wall.

4. The pressure release mechanism for the sealed battery pack as claimed in claim 2, wherein, with respect to the flexural rigidity along the direction orthogonal to a straight line connecting the fixture sections of the two locations, the flexural rigidity of the plate-like member is higher than the flexural rigidity of the wall.

5. The pressure release mechanism for the sealed battery pack as claimed in claim 3, wherein, with respect to the flexural rigidity along the direction connecting the fixture sections of the two locations, the flexural rigidity of the plate-like member is higher than the flexural rigidity of the wall.

6. The pressure release mechanism for the sealed battery pack as claimed in claim 3, wherein the flexural rigidity of the wall along the direction connecting the fixture sections of the two locations is higher than the flexural rigidity of the wall along the direction orthogonal to the direction connecting the fixture sections.

7. The pressure release mechanism for the sealed battery pack as claimed in claim 1, wherein a predetermined initial gap is provided between the plate-like member and the wall which are mutually adjacent to each other.

8. The pressure release mechanism for the sealed battery pack as claimed in claim 1, which further comprises a sheet-like rupture member overlapped on the opening section to enclose the opening section and broken by a predetermined pressure.

* * * * *